(12) United States Patent
Huynh Van et al.

(10) Patent No.: US 9,760,528 B1
(45) Date of Patent: Sep. 12, 2017

(54) METHODS AND SYSTEMS FOR CREATING A NETWORK

(71) Applicant: GLUE NETWORKS, INC., Sacramento, CA (US)

(72) Inventors: Olivier Huynh Van, Sacramento, CA (US); Jacob Enoch Locken, Rocklin, CA (US)

(73) Assignee: GLUE NETWORKS, INC., Scramento, CA (US)

( * ) Notice: Subject to any disclaimer, the term of this patent is extended or adjusted under 35 U.S.C. 154(b) by 0 days.

(21) Appl. No.: 13/830,737

(22) Filed: Mar. 14, 2013

(51) Int. Cl.
G06F 15/177 (2006.01)

(52) U.S. Cl.
CPC .................. *G06F 15/177* (2013.01)

(58) Field of Classification Search
CPC combination set(s) only.
See application file for complete search history.

(56) References Cited

U.S. PATENT DOCUMENTS

| | | |
|---|---|---|
| 5,594,792 A | 1/1997 | Chouraki et al. |
| 6,061,721 A | 5/2000 | Ismael et al. |
| 6,105,131 A | 8/2000 | Carroll |
| 6,175,917 B1 | 1/2001 | Arrow |
| 6,286,038 B1 | 9/2001 | Reichmeyer et al. |
| 6,335,926 B1 | 1/2002 | Silton |
| 6,438,690 B1 | 8/2002 | Patel et al. |
| 6,513,159 B1 | 1/2003 | Dodson |
| 6,571,285 B1 | 5/2003 | Groath et al. |
| 6,640,251 B1 | 10/2003 | Wiget et al. |
| 6,715,073 B1 | 3/2004 | An et al. |
| 6,826,611 B1 | 11/2004 | Arndt |
| 6,879,679 B1 | 4/2005 | Ong |
| 6,892,300 B2 | 5/2005 | Carroll et al. |
| 6,931,526 B1 | 8/2005 | Bacha et al. |
| 6,966,060 B1 * | 11/2005 | Young et al. .................. 717/177 |
| 7,054,924 B1 | 5/2006 | Harvey et al. |
| 7,075,933 B2 | 7/2006 | Aysan |
| 7,305,479 B1 | 12/2007 | Morris et al. |
| 7,352,853 B1 | 4/2008 | Shen et al. |
| 7,373,661 B2 | 5/2008 | Smith et al. |
| 7,376,653 B2 * | 5/2008 | Hart, III ........................ 717/115 |
| 7,397,911 B2 | 7/2008 | Shen et al. |
| 7,409,709 B2 | 8/2008 | Smith et al. |
| 7,411,955 B2 | 8/2008 | Li et al. |
| 7,420,933 B2 | 9/2008 | Booth, III et al. |
| 7,447,901 B1 | 11/2008 | Sullenberger |
| 7,535,856 B2 | 5/2009 | Booth, III et al. |
| 7,558,847 B2 | 7/2009 | Strassner |
| 7,593,352 B2 | 9/2009 | Verma |
| 7,600,011 B1 | 10/2009 | Urbanek |
| 7,602,737 B2 | 10/2009 | Asati et al. |

(Continued)

FOREIGN PATENT DOCUMENTS

| | | |
|---|---|---|
| CN | 102315971 | 1/2012 |
| JP | 2000-209239 | 7/2000 |
| JP | 2011-199623 | 10/2011 |
| WO | WO-2004/090672 | 10/2004 |
| WO | WO-2013/093702 | 6/2013 |
| WO | WO-2013/177311 | 11/2013 |

OTHER PUBLICATIONS

International Search Report issued in International Application No. PCT/US2009/045155, mailed Jul. 6, 2009.

(Continued)

*Primary Examiner* — John B Walsh
(74) *Attorney, Agent, or Firm* — DLA Piper LLP US

(57) ABSTRACT

Systems and methods described herein may perform processing associated with loading, with a boot agent injection module in communication with a processor; a boot agent into a memory of a network device comprising a processor; and perform processing associated with using the boot agent to configure, with the network device, the network device to connect to a remote computer.

24 Claims, 6 Drawing Sheets

(56) References Cited

U.S. PATENT DOCUMENTS

| | | | |
|---|---|---|---|
| 7,636,771 | B2 | 12/2009 | Torii |
| 7,643,434 | B2 | 1/2010 | Mandavilli et al. |
| 7,660,265 | B2 | 2/2010 | Kreuk |
| 7,801,030 | B1 | 9/2010 | Aggarwal et al. |
| 7,869,436 | B1 | 1/2011 | Adler et al. |
| 7,940,916 | B2 | 5/2011 | Baker et al. |
| 8,041,786 | B2 | 10/2011 | Tindal et al. |
| 8,055,891 | B2* | 11/2011 | Haustein et al. ............. 713/1 |
| 8,140,642 | B1* | 3/2012 | Kadam et al. ............. 709/218 |
| 8,370,933 | B1 | 2/2013 | Buckler |
| 8,693,371 | B2 | 4/2014 | Duggan et al. |
| 8,701,078 | B1 | 4/2014 | Holler et al. |
| 8,782,182 | B2 | 7/2014 | Chaturvedi et al. |
| 8,819,202 | B1 | 8/2014 | Carolan et al. |
| 8,849,973 | B2 | 9/2014 | Leib et al. |
| 8,869,236 | B1 | 10/2014 | Tonogai et al. |
| 9,037,969 | B2 | 5/2015 | Wolff-Petersen et al. |
| 9,038,151 | B1 | 5/2015 | Chua et al. |
| 9,178,807 | B1 | 11/2015 | Chua et al. |
| 9,264,301 | B1 | 2/2016 | Chua et al. |
| 9,276,877 | B1 | 3/2016 | Chua et al. |
| 9,407,541 | B2 | 8/2016 | Barabash et al. |
| 9,450,817 | B1 | 9/2016 | Bahadur et al. |
| 2002/0112048 | A1* | 8/2002 | Gruyer et al. ............. 709/224 |
| 2002/0184388 | A1 | 12/2002 | Yaseen et al. |
| 2002/0186664 | A1 | 12/2002 | Gibson |
| 2002/0188643 | A1 | 12/2002 | Kennedy |
| 2002/0191548 | A1 | 12/2002 | Ylonen |
| 2003/0076837 | A1 | 4/2003 | Whitehill et al. |
| 2003/0135508 | A1 | 7/2003 | Chorafakis et al. |
| 2003/0169730 | A1 | 9/2003 | Narasimhan et al. |
| 2004/0028212 | A1 | 2/2004 | Lok et al. |
| 2004/0059831 | A1 | 3/2004 | Chu et al. |
| 2004/0078373 | A1 | 4/2004 | Ghoneimy et al. |
| 2004/0083379 | A1* | 4/2004 | Neuman ............. G06F 21/575 713/193 |
| 2004/0136394 | A1 | 7/2004 | Onno et al. |
| 2004/0187127 | A1 | 9/2004 | Gondi et al. |
| 2004/0261116 | A1 | 12/2004 | Mckeown et al. |
| 2005/0022208 | A1 | 1/2005 | Bolar et al. |
| 2005/0050186 | A1 | 3/2005 | Chen |
| 2005/0138634 | A1 | 6/2005 | Luty et al. |
| 2005/0198221 | A1 | 9/2005 | Manchester et al. |
| 2005/0256732 | A1 | 11/2005 | Bauer et al. |
| 2006/0050862 | A1 | 3/2006 | Shen et al. |
| 2006/0074732 | A1 | 4/2006 | Shukla et al. |
| 2006/0080425 | A1 | 4/2006 | Wood et al. |
| 2006/0112182 | A1 | 5/2006 | Chen et al. |
| 2006/0180709 | A1 | 8/2006 | Breton et al. |
| 2006/0184998 | A1 | 8/2006 | Smith |
| 2006/0187854 | A1 | 8/2006 | Booth, III et al. |
| 2006/0187855 | A1 | 8/2006 | Booth, III et al. |
| 2006/0187856 | A1 | 8/2006 | Booth, III et al. |
| 2006/0187937 | A1 | 8/2006 | Townsley et al. |
| 2006/0190570 | A1 | 8/2006 | Booth, III et al. |
| 2006/0206702 | A1* | 9/2006 | Fausak ............. 713/2 |
| 2006/0248139 | A1 | 11/2006 | Sundar |
| 2006/0259963 | A1 | 11/2006 | Maxwell |
| 2006/0268829 | A1 | 11/2006 | Nedeltchev |
| 2007/0011126 | A1 | 1/2007 | Conner et al. |
| 2007/0115990 | A1 | 5/2007 | Asati et al. |
| 2007/0130192 | A1 | 6/2007 | Bolder et al. |
| 2007/0136788 | A1 | 6/2007 | Monahan et al. |
| 2007/0165540 | A1 | 7/2007 | Elias et al. |
| 2007/0206597 | A1 | 9/2007 | Asati et al. |
| 2007/0253384 | A1* | 11/2007 | Kanagala et al. ............. 370/338 |
| 2007/0260575 | A1 | 11/2007 | Robinson et al. |
| 2007/0271451 | A1 | 11/2007 | Fluhrer |
| 2008/0037656 | A1 | 2/2008 | Hannuksela |
| 2008/0052758 | A1 | 2/2008 | Byrnes |
| 2008/0062997 | A1 | 3/2008 | Nix |
| 2008/0075090 | A1 | 3/2008 | Farricker |
| 2008/0117902 | A1 | 5/2008 | Vinneras |
| 2008/0172440 | A1 | 7/2008 | Jagannathan |
| 2008/0177868 | A1 | 7/2008 | Zibershtein et al. |
| 2008/0189757 | A1 | 8/2008 | Schackow et al. |
| 2008/0232379 | A1 | 9/2008 | Mohamed |
| 2008/0281953 | A1 | 11/2008 | Blaisdell |
| 2008/0298367 | A1 | 12/2008 | Furukawa |
| 2009/0044253 | A1 | 2/2009 | Interlandi et al. |
| 2009/0046729 | A1 | 2/2009 | Nagata |
| 2009/0059814 | A1 | 3/2009 | Nixon et al. |
| 2009/0067440 | A1 | 3/2009 | Chadda et al. |
| 2009/0073995 | A1 | 3/2009 | Pandey et al. |
| 2009/0097417 | A1 | 4/2009 | Asati et al. |
| 2009/0161679 | A1 | 6/2009 | Yang |
| 2009/0249293 | A1 | 10/2009 | Davies |
| 2009/0254639 | A1* | 10/2009 | Manchester et al. ......... 709/220 |
| 2009/0282129 | A9 | 11/2009 | Tindal |
| 2009/0304003 | A1 | 12/2009 | Huynh Van |
| 2009/0304004 | A1 | 12/2009 | Huynh Van et al. |
| 2009/0327869 | A1 | 12/2009 | Fan et al. |
| 2010/0042725 | A1 | 2/2010 | Jeon et al. |
| 2010/0054245 | A1 | 3/2010 | Asati |
| 2010/0142410 | A1 | 6/2010 | Huynh Van et al. |
| 2010/0180016 | A1* | 7/2010 | Bugwadia et al. ........... 709/220 |
| 2010/0226280 | A1 | 9/2010 | Burns et al. |
| 2010/0226372 | A1 | 9/2010 | Watanabe |
| 2010/0241698 | A1 | 9/2010 | Hillerbrand |
| 2011/0013641 | A1 | 1/2011 | Kolhi et al. |
| 2011/0176531 | A1 | 7/2011 | Rune et al. |
| 2011/0276636 | A1 | 11/2011 | Cheng et al. |
| 2011/0286384 | A1 | 11/2011 | Sugimoto et al. |
| 2011/0289261 | A1* | 11/2011 | Candelaria ............. G06F 11/20 711/103 |
| 2012/0046058 | A1 | 2/2012 | Vesterinen et al. |
| 2012/0057463 | A1 | 3/2012 | Hurtta |
| 2012/0084423 | A1 | 4/2012 | McGleenon |
| 2012/0089700 | A1 | 4/2012 | Safruti et al. |
| 2012/0218993 | A1 | 8/2012 | Masaki |
| 2012/0250516 | A1 | 10/2012 | Aggarwal et al. |
| 2012/0265324 | A1 | 10/2012 | Colombo et al. |
| 2013/0060929 | A1 | 3/2013 | Koponen et al. |
| 2013/0085914 | A1 | 4/2013 | McPherson |
| 2013/0117427 | A1* | 5/2013 | Amano et al. ............. 709/223 |
| 2013/0223442 | A1 | 8/2013 | Narayanan et al. |
| 2013/0279336 | A1 | 10/2013 | Woelker |
| 2014/0052877 | A1 | 2/2014 | Mao |
| 2014/0143419 | A1 | 5/2014 | Vyatkin et al. |
| 2014/0169158 | A1 | 6/2014 | Mishra et al. |
| 2014/0223530 | A1 | 8/2014 | Nedeltchev et al. |
| 2014/0282628 | A1 | 9/2014 | Pruss et al. |
| 2014/0371941 | A1 | 12/2014 | Keller et al. |
| 2014/0372617 | A1 | 12/2014 | Houyou et al. |
| 2015/0023210 | A1 | 1/2015 | Kis |
| 2015/0058412 | A1 | 2/2015 | Hillerbrand |
| 2015/0169345 | A1 | 6/2015 | DeCusatis et al. |
| 2015/0172195 | A1 | 6/2015 | DeCusatis et al. |
| 2015/0188772 | A1 | 7/2015 | Gasparakis |
| 2015/0229709 | A1 | 8/2015 | Pruss et al. |
| 2015/0347175 | A1 | 12/2015 | DeCusatis et al. |
| 2015/0381410 | A1 | 12/2015 | Strassner |
| 2016/0036636 | A1 | 2/2016 | Erickson et al. |
| 2016/0057207 | A1 | 2/2016 | Li et al. |
| 2016/0112246 | A1 | 4/2016 | Singh et al. |
| 2016/0112269 | A1 | 4/2016 | Singh et al. |
| 2016/0127181 | A1 | 5/2016 | Li et al. |
| 2016/0142243 | A1 | 5/2016 | Karam et al. |
| 2016/0255051 | A1 | 9/2016 | Williams et al. |
| 2016/0381124 | A1 | 12/2016 | Hwang et al. |

OTHER PUBLICATIONS

Written Opinion issued in International Application No. PCT/US2009/045115, mailed Jul. 6, 2009.
International Search Report issued in International Application No. PCT/US2009/045159, mailed Aug. 24, 2009.
Written Opinion issued in International Application No. PCT/US2009/045159, mailed Aug. 24, 2009.
International Search Report issued in International Application No. PCT/US2009/045159, mailed Sep. 24, 2009.
Written Opinion issued in International Application No. PCT/US2009/045159, mailed Sep. 24, 2009.

(56) References Cited

OTHER PUBLICATIONS

B. Weis, "Group Domain of Interpretation (GDOI) Support for RSVP", MSEC Working Group, Internet-Draft, Jun. 21, 2007 [retrieved Aug. 15, 2009], http://www.watersprings.com/pub/id/draft-weis-gdoi-for-rsvp-00.txt.
International Search Report issued in International Application No. PCT/US2009/067384, mailed Jul. 20, 2010.
Written Opinion issued in International Application No. PCT/US2009/067384, mailed Jul. 20, 2010.
File History of U.S. Appl. No. 12/471,179.
"OSGI Alliance", printed from http://www.osgi.org, on Sep. 26, 2014 (2 pages).
"Equinox Framework QuickStart Guide" printed from http://www.eclipse.org/equinox/documents/quickstart-framework.php, on Sep. 26, 2014 (5 pages).
"Human Machine Interface (HMI)" http://en.wikipedia.org/wiki/Human-machine_interface, on Sep. 26, 2014, Last updated Sep. 20, 2014 (2 pages).
Oscar Mejia, "How to Create a Command Line Program with NodeJS", Aug. 5, 2012, retrieved from https://web.archive.org/web/20130314232203/http://oscar-mejia.com/blog.how-to-create-a-command-line-program-with-nodejs/ (8 pages).
George Ornbo, "Command Line Utilities with Node.js", Jan. 2, 2014, retrieved from http://shapeshed.com/commandlineutilitieswithnodejs/ (4 pages).
"Command Line JavaScript", Oct. 15, 2012, retrieved from http://web.archive.org/web/20121015021129/ http://javascripts.cs.lmu.edu.notes.commandlinejs (8 pages).
File History of U.S. Appl. No. 13/830,801.
File History of U.S. Appl. No. 15/078,267.
File History of U.S. Appl. No. 12/634,536.
File History of U.S. Appl. No. 12/471,199.
File History of U.S. Appl. No. 14/017,696.
File History of U.S. Appl. No. 14/219,685.
File History of U.S. Appl. No. 14/219,654.
File History of U.S. Appl. No. 14/325,757.
File History of U.S. Appl. No. 14/490,424.
File History of U.S. Appl. No. 14/997,119.
File History of U.S. Appl. No. 15/056,776.
English language abstract of CN-102315971 published Jan. 11, 2012.
English language abstract of JP-2000-209239 published Jul. 28, 2000.
English language abstract of JP-2011-199623 published Oct. 6, 2011.
Jan Medved et al., "OpenDaylight: Towards a Model-Driven Sdn Controller Architecture", Proceeding of IEEE International Symposium on a World of Wireless, Mobile and Multimedia Networks 2014, 7 Pages, Oct. 9, 2014.
"Glue Networks deployment Guide for the Cisco Next-Generation Wan", May 1, 2013, retrieved from http://www.cisco.com/c/en/us/td/docs/solutions/Enterprise/WAN_and_MAN/Glue NtwksDepGuide.pfd (29 pages).
Cisco, "Cisco IOS IP Routing: BFD Configuration Guide", Release 15.1, Cisco System, Inc. retrieved from http://www.cisco.com/c/en/us/td/docs/ios/iproute_bfd/configuration/guide/15_1/irb_15_1_book.pdf, 110 pages, (Mar. 26, 2010).
U.S. Appl. No. 14/219,685.
U.S. Appl. No. 14/219,654.
U.S. Appl. No. 14/997,119.
U.S. Appl. No. 14/325,757.
U.S. Appl. No. 14/490,424.
U.S. Appl. No. 15/056,776.

* cited by examiner

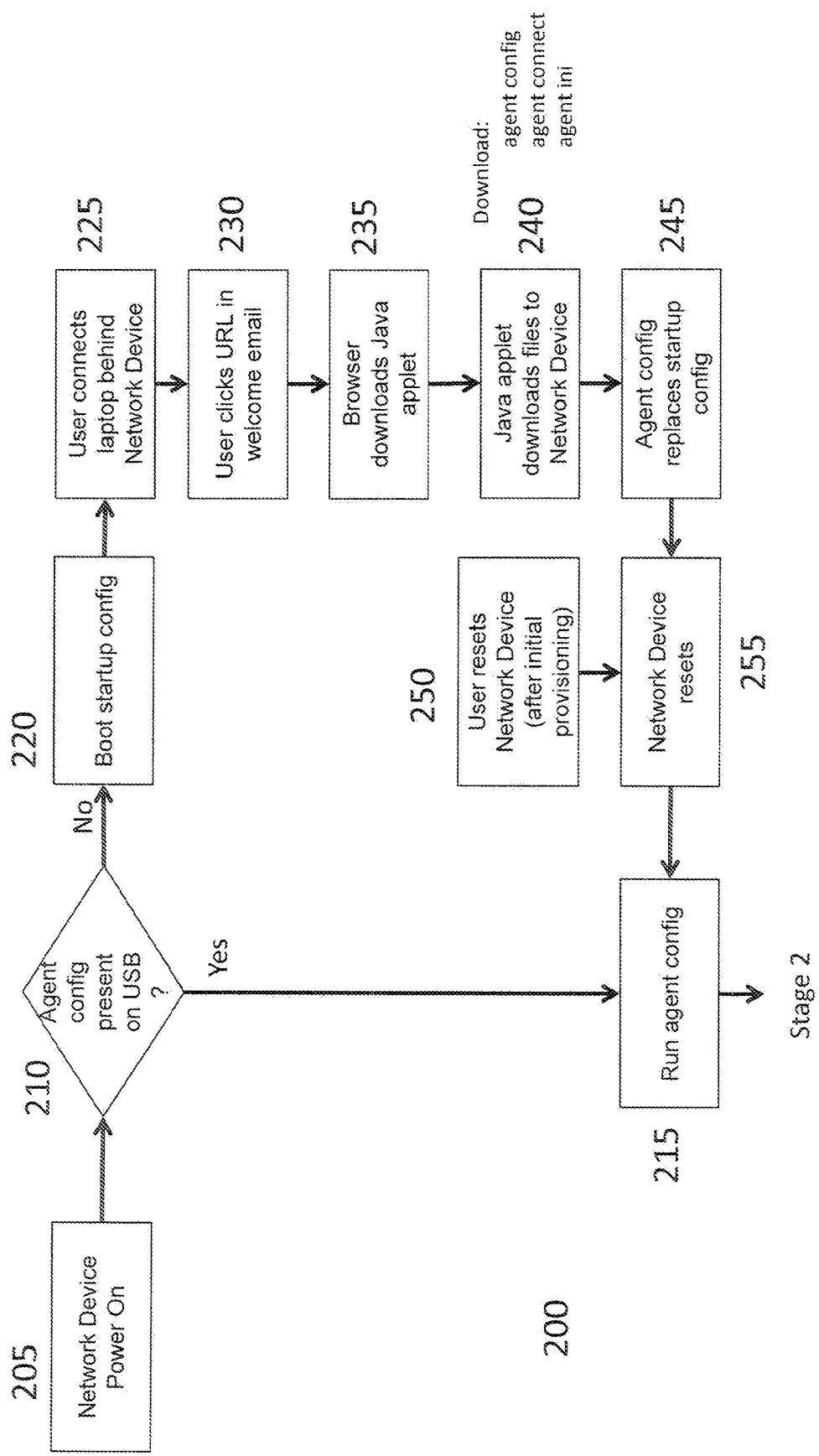

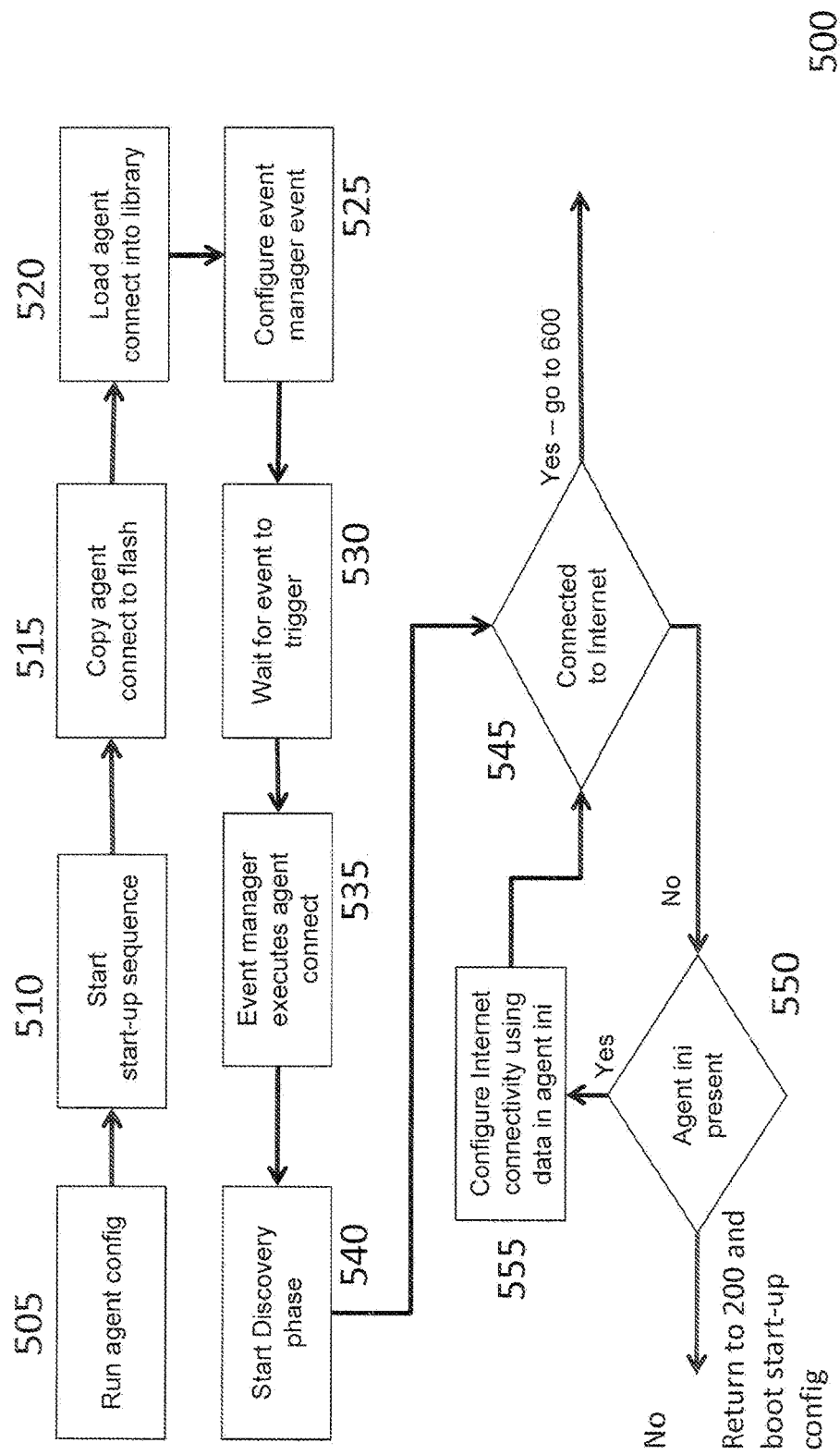

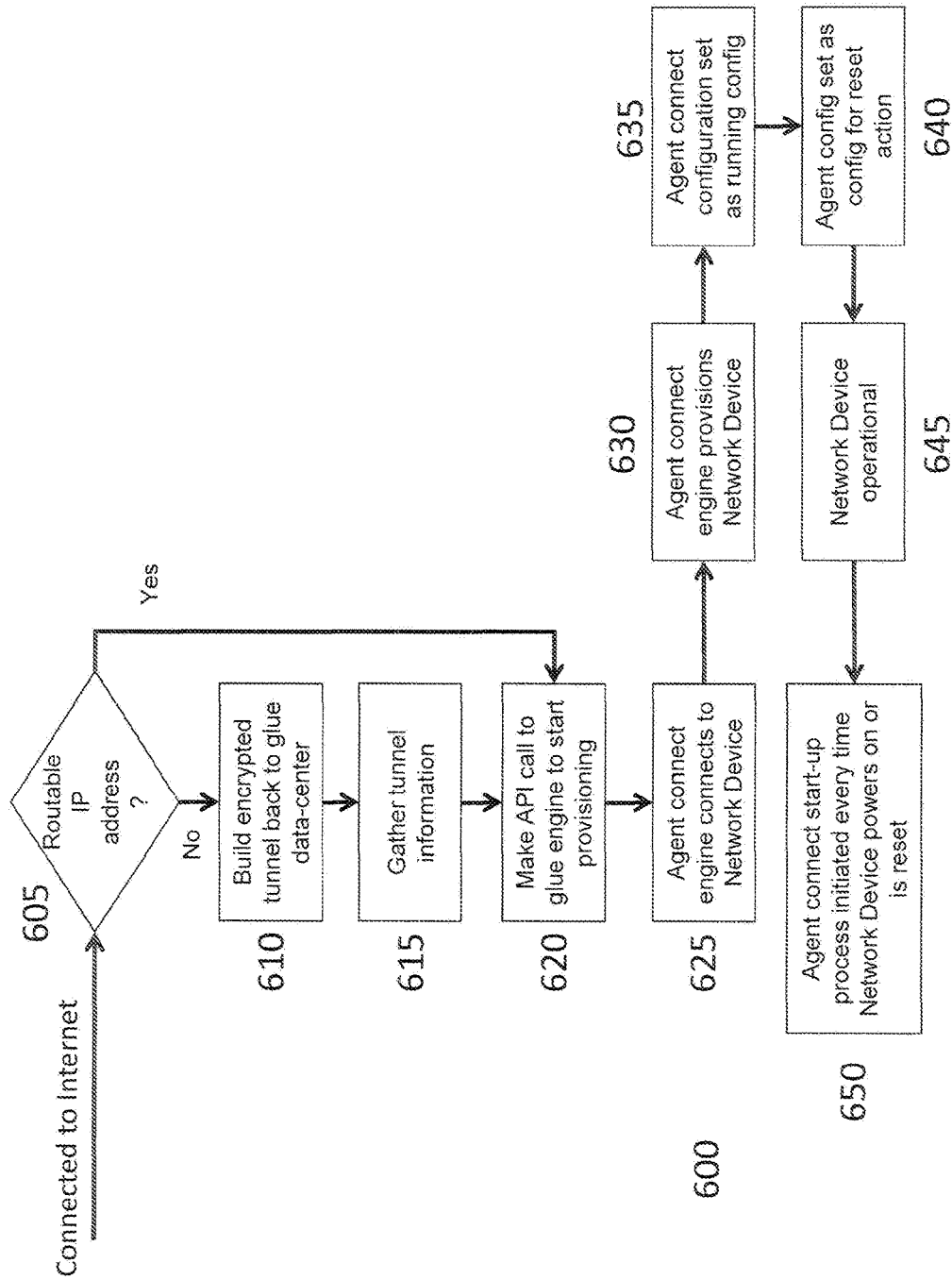
FIG. 4 - Provisioning

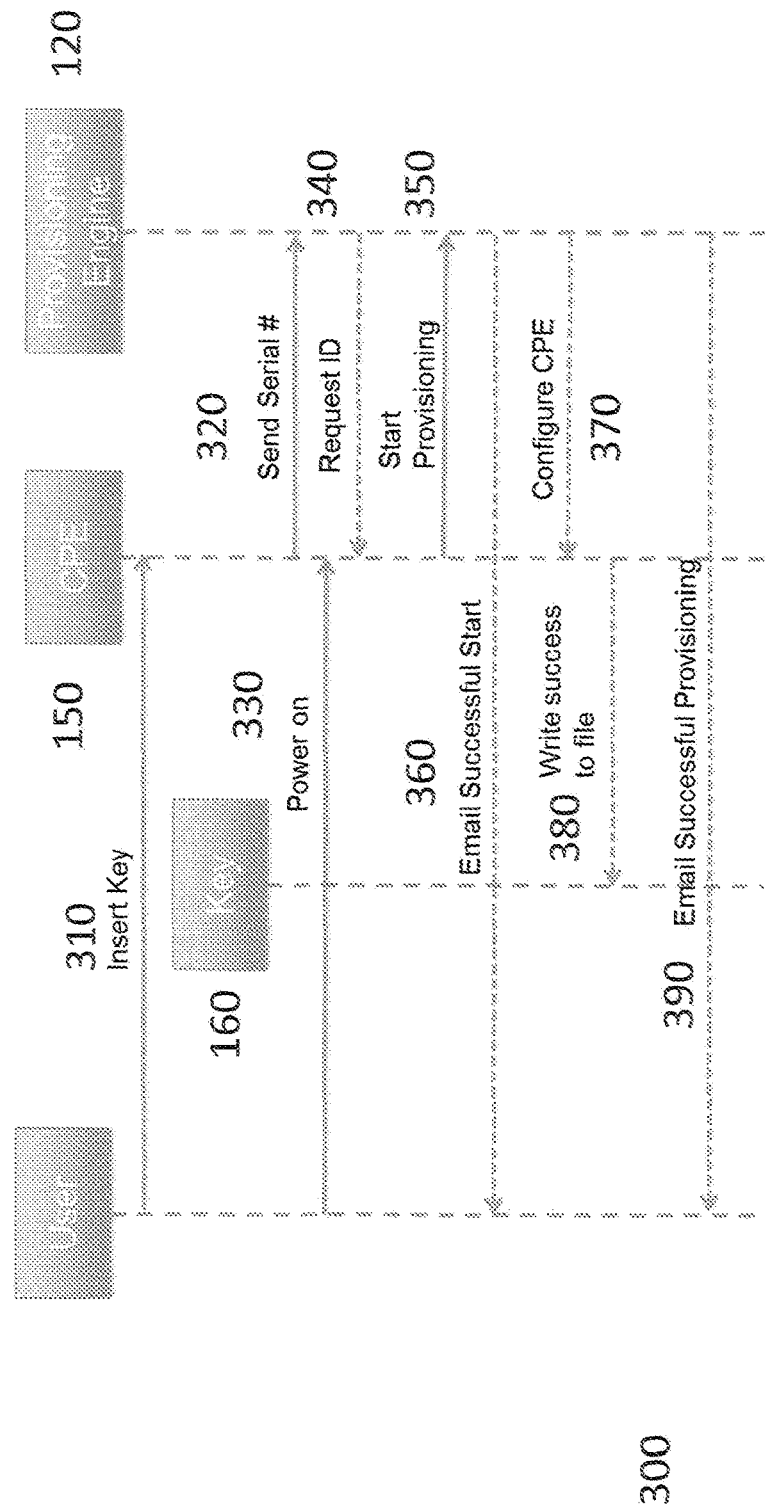

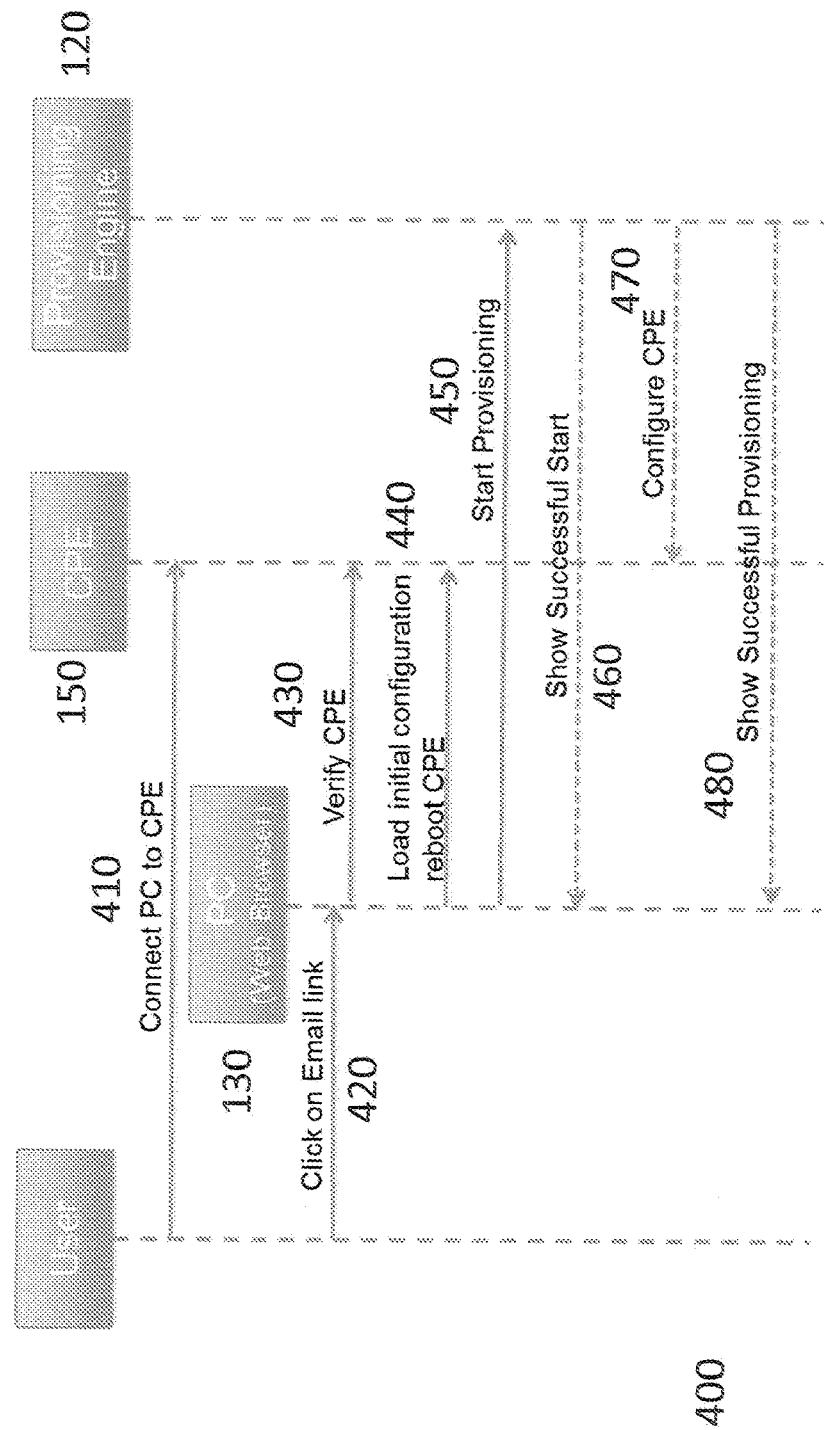

METHODS AND SYSTEMS FOR CREATING A NETWORK

BRIEF DESCRIPTION OF THE DRAWINGS

FIG. 2 is an injection method according to an embodiment of the invention.

FIG. 3 is a configuration method according to an embodiment of the invention.

FIG. 4 is a provisioning method according to an embodiment of the invention.

FIG. 5 is a provisioning method according to an embodiment of the invention.

FIG. 6 is a provisioning method according to an embodiment of the invention.

DETAILED DESCRIPTION OF SEVERAL EMBODIMENTS

Figure 1:
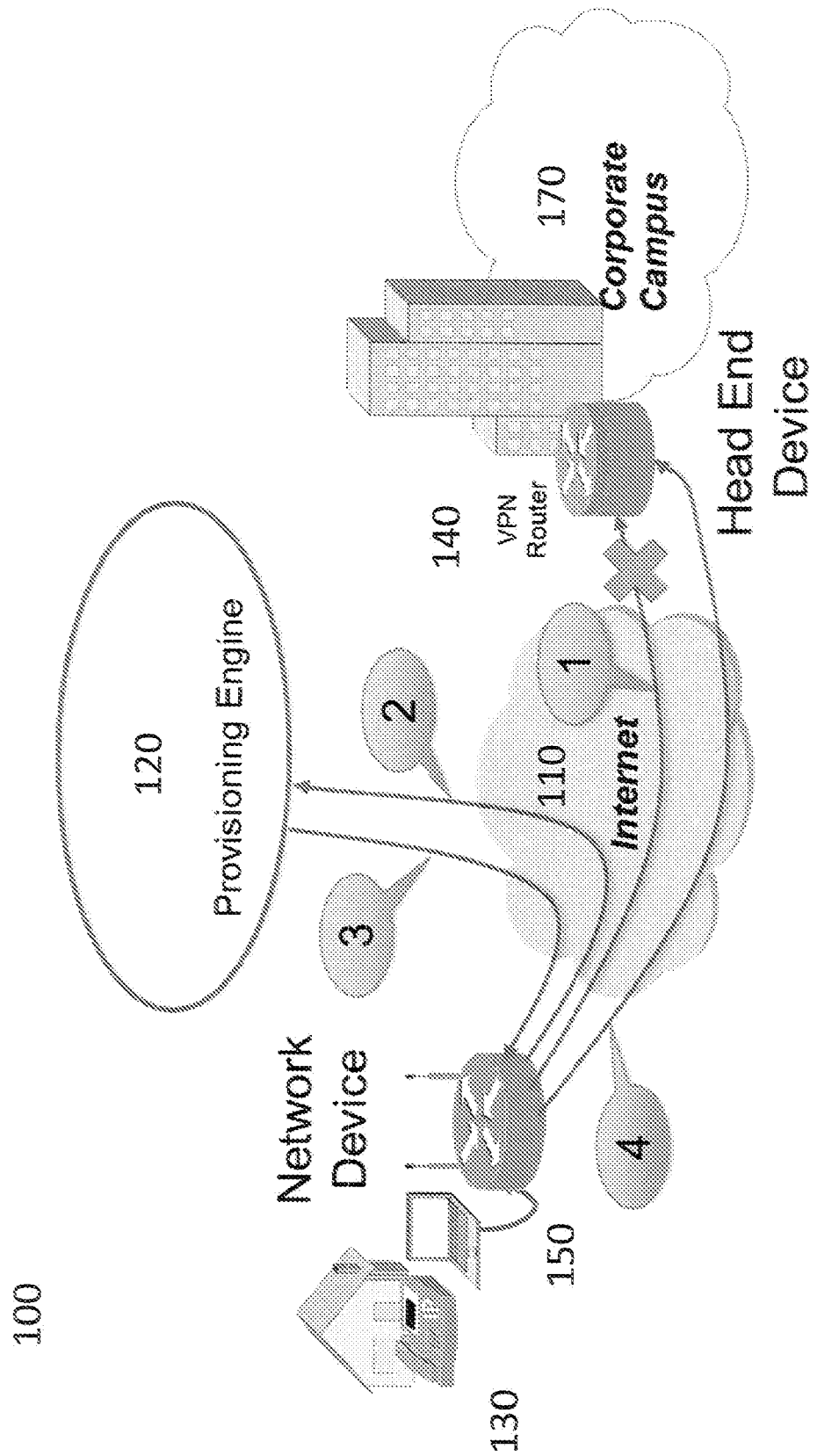
FIG. 1 is a network according to an embodiment of the invention.

Many network devices, such as routers or switches, may require configuration in order to function. For example, in the context of a complex, secure corporate network, the network devices may be configured to interact with one another. Systems and methods described herein may enable a network device to be provisioned with a complex configuration in a zero touch manner by causing a boot agent to be loaded on the network device. Once the boot agent has been loaded, it may enable the network device to connect to a provisioning engine, which may be part of a data center, for example. The provisioning engine may take over and fully provision the device. This provisioning may be accomplished without trained IT staff at the remote network device location.

Systems and methods described herein may comprise one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "router" may appear in the following specification, the disclosed embodiments are not limited to routers.

Computers may be linked to one another via a network or networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via Wi-Fi, WiMax, or other wireless connection). Connections between computers may use any protocols, including connection oriented protocols such as TCP or connectionless protocols such as UDP. Any connection through which at least two computers may exchange data can be the basis of a network.

The systems and methods described herein may be related to the teachings of U.S. patent application Ser. No. 12/634,536, "SYSTEM AND METHOD FOR PROVIDING VIRTUAL PRIVATE NETWORKS" filed Dec. 9, 2009 (published as US 2010/0142410); U.S. patent application Ser. No. 12/471,199, "REGIONAL VIRTUAL VPN" filed May 22, 2009 (published as US 2009/0304004); and U.S. patent application Ser. No. 12/471,179, "GLOBAL VIRTUAL VPN" filed May 22, 2009 (published as US 2009/0304003), the entirety of each of which is incorporated by reference herein.

FIG. 1 is a network 100 according to an embodiment of the invention. In this example, various devices such as the head end device 140 and the network device 150 may communicate with one another via the internet 110 or some other public or private network. In FIG. 1, the head end device 140 is a VPN router and the network device 150 is a router, although other head end devices 140 and/or network devices 150 may be used. When they are connected to one another via the internet 110, the head end device 140 and the network device 150 may facilitate communication between head end computers 170 associated with the head end device 140 (e.g., corporate campus computers and/or a local secure campus network) and home computers 130 associated with the network device 150 (e.g., remote IP phones, PCs, etc.). As will be described in greater detail below, a provisioning engine 120 may be used to set up the network device 150 so that it can communicate with the head end device 140.

In the network 100 shown in FIG. 1, an example remote provisioning process for the network device 150 may proceed as follows. In 1, the network device 150 is not connected to the secure corporate network via the head end device 140 but is connected to the internet 110. In 2, a provisioning process may be initiated. For example, the provisioning process may employ one of two methods. In a first method, an end user may install a USB key on the network device 150 and power on the network device 150. The USB key may automatically configure the network device 150 to contact the provisioning engine 120. In a second method, the end user may connect a PC or other device 130 to the network device 150 via one of the LAN ports on the network device 150 or in some other way. The user may access their email, open a configuration email, and click on a configuration URL. This action may launch a Java applet that may automatically configure the network device 150 to contact the provisioning engine 120. The Java applet may be started via a link or program provided to the PC 130 in some other way as well. Both of these methods are described in greater detail below. In 3, the provisioning engine 120 may configure the network device 150 based on specific configuration information to complete the provisioning. In 4, the provisioned network device 150 may now be part of the secure corporate network and may communicate with the head end device 140 accordingly.

FIG. 2 is an injection method 200 according to an embodiment of the invention. In 205, the network device 150 may power on. When a network device 150 powers on it may follow a set boot sequence. For example, a boot sequence may be as follows. First, the network device 150 may execute a POST (power on self test). Then, the network device 150 may load operating system software. The operating system software may look for a valid configuration file stored in a memory such as an NVRAM. Configuration files may be labeled startup-config or startup.cfg, for example. If a startup-config file is in NVRAM, the network device 150 may load and run this file. However, many network devices 150 may include a mechanism to allow for this boot sequence to be overridden. The method 200 may take advantage of this mechanism by loading a config file onto the network device 150 to act as a boot agent to allow remote provisioning of the network device 150. The agent-boot.cfg agent can be injected onto the network device from a USB key or over an internet connection, for example.

In 210, when the startup.cfg runs it may look for the presence of a boot agent configuration file (indicated throughout by "agent-boot.cfg", although other file names may be used) on a USB key. The USB key may also hold additional files, for example an agent-connect file and agent-boot.ini file, which are described in greater detail below. If no USB key is found, or if the agent-boot.cfg file is not found on the USB key, in 220 the startup.cfg may continue to run and the network device 150 may power up with basic, unsecured, un-configured Internet access. If the agent-boot.cfg file is found on the USB key, in 215 the network device 150 may execute that config (cfg) file and may not continue with the default startup.cfg. Execution of the boot agent config file is described in greater detail below with respect to FIG. 3.

If no USB key is present, in 220 the network device 150 may boot the startup.cfg file and configure basic internet access. Once the network device 150 has basic internet connectivity, in 225 another computer 130 may begin interfacing with the network device 150. For example, an end user may connect a laptop to one of the LAN ports on the network device 150 and then access their email on the laptop. The user may have been sent an email with instructions containing a URL. The user may be instructed to click on the URL. In response, in 230 the computer 130 may connect to a web server in a data center. In 235, the URL may cause a web page to be displayed and a Java applet or other executable program to be downloaded and executed. In some embodiments, the Java applet may be obtained and executed in some other fashion. In 240, the Java applet may download the agent-boot.cfg, and, in some embodiments, the agent-connect script and agent-boot.ini files to a memory in the network device 150, for example a flash memory. In 245, the Java applet may then overwrite the startup.cfg file with the agent-boot.cfg. Then, in 255, the Java applet may cause the network device 150 to reset. When the network device 150 resets, it may follow its standard boot process but because the startup.cfg has been replaced by agent-boot.cfg, in 215 the network device 150 may execute agent-boot.cfg. Once the boot agent config file is installed in 245, if, in 250, the network device 150 executes a hard reset, it will boot with the custom agent-boot.cfg config.

FIG. 3 is a configuration method 500 according to an embodiment of the invention. In 505 the network device 150 may run the boot agent config file, and in 510 the network device 150 may begin a start up sequence. Once the network device 150 starts to execute the agent-boot.cfg, regardless of how the agent was injected onto the network device 150, in 515 the network device 150 may load the agent-connect script into flash memory, if this has not already been done. Once the agent-connect script is loaded into flash, in 520 a command may be executed to load this script into a network device 150 library. In 525, the network device 150 may be set up to create an event manager event and to configure the event management event to call the agent-connect script. The agent-boot.cfg file may be careful to configure an event that will always trigger. In 530, the network device 150 may wait for the event to trigger. Once the event is triggered, in 535 the event manager may cause the network device 150 to execute the agent-connect script. In 540, the agent-connect script may initiate a discovery phase, wherein it may gather information about the network device 150. For example, the information may include, but is not limited to, the IP address the network device 150 has been assigned, whether the network device 150 it routable or behind NAT, the network device 150 model number, the operating system image that is loaded on the network device 150, the network device 150 serial number, and the options installed or licensed for the network device 150.

Once the discovery phase is complete and the information about the network device 150 is known, in 545 the script may determine if the network device 150 is connected to the internet. If it is connected to the internet, a provisioning method such as that described below with respect to FIG. 4 may begin. If the network device 150 has no internet connectivity (which may happen in the USB scenario, for example), it could be because the network device 150 needs some basic configurations to be set prior to being able to connect. For example, configuration may be required if the network configuration requires the network device 150 to have a fixed IP address to be able to connect to the public internet (i.e., the network device 150 has no DHCP capability to assign the IP address when it connects), or if the network device 150 has a DSL connection to the internet rather than an Ethernet connection (in this case DSL credentials may be required before the network device 150 can connect), or if the connection to the internet is over 3G or LTE wireless.

When no Internet connection is detected, in 550 the script looks for a boot agent initialization file that may have been injected as described above. In this example the file is called agent-boot.ini, although other file names may be possible. This file may contain the information required to be able to setup basic internet connectivity, for example the static IP address that must be injected onto the network device 150, or the DSL credentials required to get DSL service. If no agent ini file is found, the network device 150 may return to the injection process 200 described above and make another attempt to get the needed files. If the agent ini file is found, in 555 the network device 150 may configure internet connectivity using the data from the agent ini file. Then, in 545, the network device 150 may determine whether it is connected to the internet and move on to provisioning if so.

The agent-boot.cfg file and the agent-connect script may be generic files which may be used in all scenarios. The agent-boot.ini may be customized and injected on a case by case basis for each network device 150. This may be done automatically as follows. When a request is made, for example to a data center, to create a new network device 150, a workflow engine may detect if the configuration uses a standard Ethernet network device 150 or a variant using DSL or 3G. It may also detect whether the network device 150 will have a dynamic IP address or will require a static address. If the configuration is for a standard Ethernet network device 150 with dynamic IP, then no special data may be required for the agent-boot.ini. If the network device 150 requires DSL, 3G, a fixed IP address, and/or some other special configuration, a specific cvo-boot.ini file may be generated and injected along with the agent-boot.cfg and agent-connect files.

Once agent-connect has processed the agent-boot.ini data to set any custom settings for the network device 150, the network device 150 should have internet connectivity and can start provisioning, as described below.

FIG. 4 is a provisioning method 600 according to an embodiment of the invention. If the network device 150 is connected to the internet, in 605 the network device 150 may determine if it has a public routable IP address (i.e., it is connected directly to the public internet, for example) or if it has a private address (i.e. it is connected behind a NAT router that is a gateway to the public internet, for example). If the network device 150 has a private address, it may initiate a process to build a secure, encrypted, tunnel to a data center. For example, in 610 the network device 150 may build the tunnel, and then in 615 the network device 150 may gather tunnel information. Once that encrypted tunnel has been built out from behind the NAT router to the data center, two way communications between the network device 150 and the data center may be possible. At this stage, or if the network device 150 has a public routable IP address, in 620 the script may make a call to the data center including a request to start provisioning. In the case where a tunnel has been built, the call may be made through the encrypted tunnel. If the network device 150 has a public IP address, the call may be made via the internet and may include the IP address at which the network device 150 can be reached. The data center may comprise the provisioning engine 120, which may perform the functions of the data center described below.

Once the request to the data center for the provisioning to start has been made, the data center may take over and dynamically build and download the configuration required by the network device 150 based upon a template that was specified in the portal and the information determined in the discovery phase. For example, in 625 an agent connect engine may connect to the network device 150. In 630, the agent connect engine may provision the network device 150. In 635, an agent connect configuration may be set as a running config. The running configuration may be loaded whenever the network device 150 is powered on or reset. In 640, the agent config may be set as a config for a reset action. Thus, agent-boot.cfg config may be the config that will be loaded whenever the network device 150 is made to perform a hard reset, for example. These processes are described in greater detail in U.S. patent application Ser. No. 12/634,536, "SYSTEM AND METHOD FOR PROVIDING VIRTUAL PRIVATE NETWORKS" filed Dec. 9, 2009 (published as US 2010/0142410). In 645, it may be determined that the network device 150 is operational. At this point, the network device 150 may be fully provisioned and may now be part of a secure corporate network. In case of future network device 150 power on or reset, in 650 the agent connect start up process may be initiated. Whenever the network device 150 powers on or has hard reset, it may follow the provisioned boot process and may connect back to the data center to check if it has the correct configuration or if any config updates are available.

The provisioning engine 120 may comprise a library of scripts (methods, applications, APIs, etc.) which may be used in the agent-connect script to interact with the network device 150 and the data center. These scripts may use encrypted traffic between the network device 150 and the data center so that data can be exchanged, requests can be made, and so that status information can be passed back to the data center for monitoring and logging purposes. These scripts may provide an API into the data center that can be used by the script to access capabilities of the data center.

FIG. 5 is a provisioning method 300 according to an embodiment of the invention. This method 300 is an overview of the provisioning described above for an embodiment employing a USB key injection process. In 310 a user may insert the USB key 160 into the network device 150. In 320 the serial number of the key 160 may be sent to the provisioning engine 120, and in 330 the network device 150 may be powered on. In 340, the provisioning engine may request an ID from the network device 150. In 350, the network device 150 may provide the ID and the provisioning engine 120 may start provisioning as described above. In 360, the provisioning engine 120 may inform the user of a successful start to the provisioning, for example via email. In 370, the provisioning engine 120 may configure the network device 150 as described above. In 380, the network device 150 may store an indication of successful configuration in the USB key 160. In 390, the provisioning engine 120 may inform the user of a successful provisioning, for example via email.

FIG. 6 is a provisioning method 400 according to an embodiment of the invention. This method 400 is an overview of the provisioning described above for an embodiment employing a network based injection process. In 410 a user may connect a PC 130 or other computer to the network device 150. In 420 the user may initiate the process, for example by clicking on a link as described above. In 430 the PC 130 may verify the network device 150. In 440, the initial configuration may be loaded into the network device 150, and the network device 150 may be rebooted. In 450, the PC 130 may contact the provisioning engine 120 and the provisioning engine 120 may start provisioning as described above. In 460, the provisioning engine 120 may inform the user of a successful start to the provisioning, for example via a notification in a web browser. In 470, the provisioning engine 120 may configure the network device 150 as described above. In 480, the provisioning engine 120 may inform the user of a successful provisioning, for example via a notification in a web browser.

The systems and methods described above may provide at least the following features, as well as additional features described above.
1. Ability to remotely configure a network device via the internet with a cloud-based provisioning engine
2. Use of a USB key to enable automated provisioning of network device
3. Use of email URL link to activate automated provisioning of network device
4. Injection of boot agent onto network device via USB or internet connection
5. Use of a boot agent loaded onto network device to remotely connect to a cloud-based provisioning engine
6. Use of a cloud-sourced script loaded onto the network device to create a local event triggered by the network device event manager
7. Remote collection of information on network device to detect connection type and use a local initialization file to provision credentials to interface
8. Automatically determine if network device has a public or private IP address and configure communication back to the cloud-based provisioning engine
9. Automatic configuration updates via communication with cloud-based provisioning engine upon power on or hard reset of network device
10. Use of a scripts library (methods) to interact between the network device and the cloud-based provisioning engine While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method of creating a network, comprising:
performing processing associated with creating the network by:
loading in a telecommunications system, with a boot agent injection module in communication with a processor, a boot agent into a memory of a network router device and/or a network switch device comprising a processor, the boot agent comprising executable code, the network router device and/or the network switch device capable of transporting connection-oriented protocols and/or connectionless protocols; and
performing processing associated with using the boot agent to configure, with the network router device and/or the network switch device, the network router device and/or the network switch device to connect to a remote computer such that any default booting behavior of the network router device and/or the network switch device is interrupted and replaced by a custom configuration file that uses the boot agent, the custom configuration file causing the network router device and/or the network switch device to automatically call a remotely located provisioning engine and provision itself for full network functionality without user intervention.

2. The method of claim 1, wherein performing processing associated with loading, with the boot agent injection module, the boot agent into a memory of a network router device and/or the network switch device comprises:
performing processing associated with transferring, with the boot agent injection module, the boot agent to the network device via a USB connection.

3. The method of claim 1, wherein performing processing associated with loading, with the boot agent injection module, the boot agent into a memory of a network router device and/or the network switch device comprises:
performing processing associated with transferring, with the boot agent injection module, the boot agent to the network router device and/or the network switch device via a network connection.

4. The method of claim 3, wherein performing processing associated with loading, with the boot agent injection module, the boot agent into a memory of a network router device and/or the network switch device further comprises:
performing processing associated with sending, with the boot agent injection module, an HTML link to a computer in communication with the network router device and/or the network switch device via a network connection, the HTML link comprising a link to the boot agent.

5. The method of claim 1, wherein performing processing associated with using the boot agent to configure, with the network router device and/or the network switch device, the network router device and/or the network switch device to connect to a remote computer comprises:
performing processing associated with using the boot agent to analyze, with the network router device and/or the network switch device, a property of the network router device and/or the network switch device; and
performing processing associated with using the boot agent to configure, with the network router device and/or the network switch device, the network router device and/or the network switch device according to the property of the network device.

6. The method of claim 1, wherein performing processing associated with using the boot agent to configure, with the network device, the network router device and/or the network switch device to connect to a remote computer comprises:
performing processing associated with sending, with the network router device and/or the network switch device, a test message to the remote computer via a network connection.

7. The method of claim 1, wherein performing processing associated with using the boot agent to configure, with the network router device and/or the network switch device, the network router device and/or the network switch device to connect to a remote computer comprises:
performing processing associated with storing, with the network router device and/or the network switch device, configuration data into the memory of the network router device and/or the network switch device, the configuration data enabling the network router device and/or the network switch device to connect to the remote computer.

8. The method of claim 1, wherein performing processing associated with using the boot agent to configure, with the network router device and/or the network switch device, the network router device and/or the network switch device to connect to a remote computer comprises:
performing processing associated with using the boot agent to determine, with the network router device and/or the network switch device, whether the network router device and/or the network switch device is connected to the remote computer via a direct connection or an indirect connection.

9. The method of claim 1, wherein performing processing associated with using the boot agent to configure, with the network router device and/or the network switch device, the network router device and/or the network switch device to connect to a remote computer comprises:
performing processing associated with using the boot agent to configure, with the network router device and/or the network switch device, the network router device and/or the network switch device to communicate with the remote computer using a scripts library.

10. The method of claim 1, further comprising:
performing processing associated with loading, with the boot agent injection module; a boot agent update into the memory of the network router device and/or the network switch device; and
performing processing associated with using the boot agent update to configure, with the network router device and/or the network switch device, the network router device and/or the network switch device to connect to the remote computer.

11. A system for creating a network, comprising:
a network router device and/or a network switch device comprising a processor and a memory; and
a boot agent injection module in communication with a processor, the boot agent injection module configured to create the network by performing processing associated with loading in a telecommunications system, a boot agent into the memory of the network router device and/or the network switch device, the boot agent comprising executable code, the network router device and/or the network switch device capable of transporting connection-oriented protocols and/or connectionless protocols;
wherein the network router device and/or a network switch device is configured to perform processing associated with using the boot agent to configure the network router device and/or a network switch device to connect to a remote computer such that any default booting behavior of the network router device and/or the network switch device is interrupted and replaced by a custom configuration file that uses the boot agent, the custom configuration file causing the network router device and/or the network switch device to automatically call a remotely located provisioning engine and provision itself for full network functionality without user intervention.

12. The system of claim 11, wherein the boot agent injection module is configured to perform processing associated with loading the boot agent into a memory of the network router device and/or the network switch device by:
performing processing associated with transferring the boot agent to the network router device and/or the network switch device via a USB connection.

13. The system of claim 11, wherein the boot agent injection module is configured to perform processing associated with loading the boot agent into a memory of the network router device and/or the network switch device by:
performing processing associated with transferring the boot agent to the router device and/or the network switch network device via a network connection.

14. The system of claim 13, wherein the boot agent injection module is further configured to perform processing associated with loading the boot agent into a memory of the network router device and/or the network switch device by:
performing processing associated with sending an HTML link to a computer in communication with the network router device and/or the network switch device via a network connection, the HTML link comprising a link to the boot agent.

15. The system of claim 11, wherein performing processing associated with using the boot agent to configure, with the network router device and/or the network switch device, the network router device and/or the network switch device to connect to a remote computer comprises:
performing processing associated with using the boot agent to analyze, with the network router device and/or the network switch device, a property of the network router device and/or the network switch device; and
performing processing associated with using the boot agent to configure, with the network router device and/or the network switch device, the network router device and/or the network switch device according to the property of the network router device and/or the network switch device.

16. The system of claim 11, wherein performing processing associated with using the boot agent to configure, with the network router device and/or the network switch device, the network router device and/or the network switch device to connect to a remote computer comprises:
performing processing associated with sending, with the network router device and/or the network switch device, a test message to the remote computer via a network connection.

17. The system of claim 11, wherein the network device is configured to perform processing associated with using the boot agent to configure the network router device and/or the network switch device to connect to a remote computer by:
performing processing associated with storing configuration data into the memory of the network router device and/or the network switch device, the configuration data enabling the network router device and/or the network switch device to connect to the remote computer.

18. The system of claim 11, wherein the network router device and/or the network switch device is configured to perform processing associated with using the boot agent to configure the network router device and/or the network switch device to connect to a remote computer by:
performing processing associated with using the boot agent to determine whether the network router device and/or the network switch device is connected to the remote computer via a direct connection or an indirect connection.

19. The system of claim 11, wherein the network device is configured to perform processing associated with using the boot agent to configure the network router device and/or the network switch device to connect to a remote computer by:
performing processing associated with using the boot agent to configure the network router device and/or the network switch device to communicate with the remote computer using a scripts library.

20. The system of claim 11, wherein:
the boot agent injection module is further configured to perform processing associated with loading a boot agent update into the memory of the network router device and/or the network switch device; and
the network device is further configured to perform processing associated with using the boot agent update to configure the network router device and/or the network switch device to connect to the remote computer.

21. The method of claim 1, wherein the boot agent further comprises a configuration file.

22. The system of claim 11, wherein the boot agent further comprises a configuration file.

23. The method of claim 1, wherein the boot agent comprises at least one script containing the executable code.

24. The system of claim 11, wherein the boot agent comprises at least one script containing the executable code.

* * * * *